UNITED STATES PATENT OFFICE.

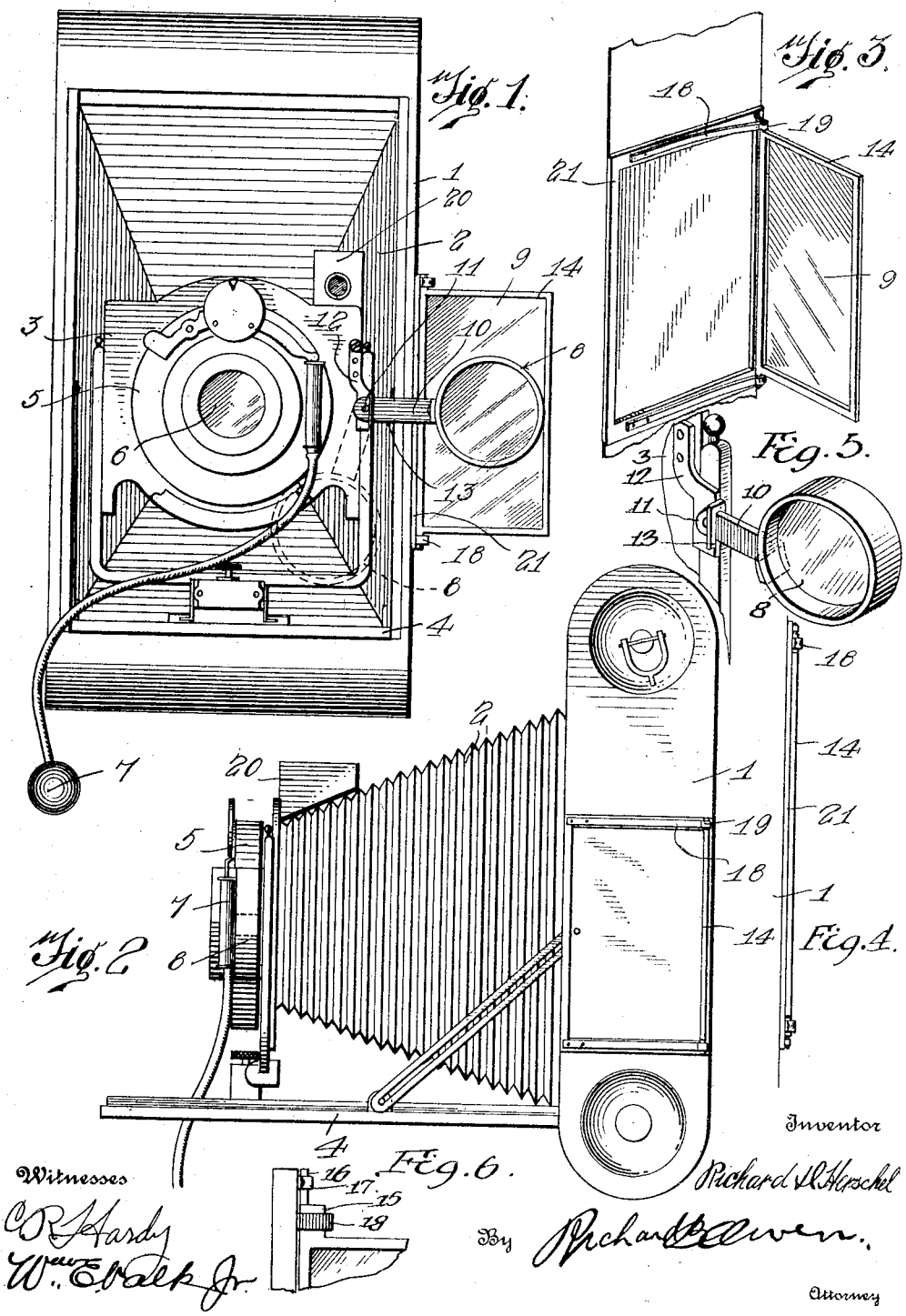

RICHARD D. HERSCHEL, OF BIRMINGHAM, ALABAMA.

CAMERA FOCUSING DEVICE.

1,226,660.  Specification of Letters Patent.  Patented May 22, 1917.

Application filed May 8, 1915. Serial No. 26,822.

*To all whom it may concern:*

Be it known that I, RICHARD D. HERSCHEL, a citizen of the United States, residing at Birmingham, in the county of Jefferson and State of Alabama, have invented certain new and useful Improvements in Camera Focusing Devices, of which the following is a specification.

This invention relates to focusing devices for cameras of the type in which a focus is obtained through adjustment of the camera lens toward and from the image.

The essential object of the invention is to provide a device of simple and effective construction adapted to be conveniently and expeditiously operated, arranged to dispose the same in view of the operator or to be easily reduced as to the projection for storage in a camera box or casing.

A further object of the invention is to provide a focusing device in which the view-finder plate or screen is fixed relatively to the camera box or casing and the finder-lens adjustable with the camera-lens relatively thereto.

The above and additional objects are accomplished by such means as are illustrated in their preferred embodiment in the accompanying drawings, described in the following specification and then more particularly pointed out in the claim which is appended hereto and forms a part of this application.

In describing my invention in detail reference will be had to the accompanying drawings wherein like characters denote like or corresponding parts throughout the several views, and in which:—

Figure 1 is a front view of a camera equipped with my improved focusing device;

Fig. 2 is a side elevation of the camera as illustrated in Fig. 1;

Fig. 3 is a detail perspective view of the view-finder plate or screen;

Fig. 4 is an edge view of the mentioned plate when folded;

Fig. 5 is a detail perspective view of the focusing lens;

Fig. 6 is a fragmentary view illustrating the means utilized to maintain the finder plate or screen in an extended or projected position.

Before proceeding with the description of the drawings I desire to call particular attention to the fact that while I have evolved my invention with reference to its use as a focusing device for folding cameras, the same may be readily utilized, and in a like capacity, in connection with any and all of the various types of cameras now used.

Referring now to the drawings by numerals, 1 designates the camera box or casing, 2 the bellows, 3 the carriage, 4 the bed or front cover, 5 the shutter casing, 6 the camera lens and 7 the shutter operating mechanism of a modern folding camera. The parts thus mentioned may be modified or changed as desired, this for the reason that said parts do not constitute a part of the present invention, they, the said parts, being shown only for the purpose of exemplification.

The focusing device in its preferred embodiment may be said to consist of lens 8, and a view-finder plate or screen 9, each of the mentioned parts being designated as an entirety. Lens 8 is adjustable toward and from the screen 9, being at all times maintained in the same or substantially the same vertical plane as the camera lens 6. Screen 9 is stationary with respect to the camera box or casing and at all times (that is when in use) maintained in the same or substantially the same vertical plane as the film or plate (not shown).

An arm 10 affording a support for the focusing lens 8, is pivotally secured as at 11 to a fastening means 12 in turn affixed in any suitable manner to the carriage 3. Said arm 10, together with the focusing lens carried thereby, is movable from a position at one side of the camera box or casing 1 and in horizontal alinement with the camera lens 6 to the position in which it is shown by the dotted lines in Fig. 1, the focusing device, when the lens 8 is in the latter position, being rendered inoperative. A suitable catch or keeper 13 is associated with the support or bracket 12 to maintain the arm and lens extended. The lens employed is preferably of the single convexo-convex type.

Coming now to a detail description of the view-finder plate or screen, 14 designates a frame (preferably rectangular) within which the screen is arranged. A flat pintle or projection 15 is formed at each end of the frame, from which pintle or projection a spindle 16 extends. Brackets 17 embrace the spindle 16 to in this manner mount the screen for hinged movement relatively to the box or casing 1.

A leaf spring 18 affixed to the mentioned box or casing, is associated with each pintle 15 to afford a retaining means whereby the frame 14 is held projected or extended. Leaf spring 18 thus utilized is crimped or offset at its free end or as at 19 to engage with the edge of its associated pintle and in this manner yieldingly or releasably maintains the screen and consequently the frame, in vertical alinement with the film or plate, when it is desired that my improved focusing device be used.

By the construction noted, it is evident that the usual type of view-finder (here shown and designated 20) may be dispensed with, the necessity of approximately gaging the distance between the image and the lens, through the use of a range finder, overcome; that the annoyance and inconvenience incident to use of a screen or curtaining device made a thing of the past.

During conveyance of the camera from place to place, or when not in use, the frame 14 and the screen 9 carried thereby may be folded to lie flat against one side of the camera box or casing within a suitable rectangular inclosure frame 21 therefor, the frame 14 being thus maintained through the engagement of the springs 18 with the pintles forming a part thereof. Focusing lens 8 may be swung into the position indicated by the dotted lines in Fig. 1 and withdrawn, through movement of the carriage 3 to lie within the camera box or casing and thus hidden from view.

In use, an accurate picture of the image to be photographed may be obtained by reference to the rear face of the screen 9, the picture thus obtained being obtained without necessitating a shading of the screen or in any way curtaining a single part of the focusing device. The angle of the light rays upon the focusing device will in no way decrease the clearness of the picture obtained through association of the mentioned focusing device parts.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:—

In a focusing device for cameras, the combination with the camera box, the camera lens and an adjustable support for said lens, of a foldable focusing screen affixed to the mentioned box at one side thereof, means to maintain the mentioned screen either in an operative or in a folded position, a focusing lens affixed to the mentioned support at one side of the camera lens, the mentioned focusing lens being movable with the camera lens toward and from the screen, said lens being also movable into and out of a position in line with the mentioned screen, the lens when out of alinement with the mentioned screen being movable with the camera lens interiorly of the camera box, substantially as described.

In testimony whereof I affix my signature in presence of two witnesses.

RICHARD D. HERSCHEL.

Witnesses:
F. H. BRYANT,
ALAN M. SMITH.

Copies of this patent may be obtained for five cents each, by addressing the "Commissioner of Patents, Washington, D. C."